United States Patent [19]

Fortson

[11] Patent Number: 4,474,291

[45] Date of Patent: Oct. 2, 1984

[54] TACKLE BOX WITH PIVOTAL TRAYS

[76] Inventor: Warren D. Fortson, 320 Bay Park Dr., Brandon, Miss. 39042

[21] Appl. No.: 384,972

[22] Filed: Jun. 4, 1982

[51] Int. Cl.³ .................... A45C 11/00; B65D 85/54
[52] U.S. Cl. .................... 206/315.11; 43/54.1; 206/373; 220/331; 220/334; 312/327; 312/DIG. 33
[58] Field of Search ............... 206/315, 349, 372, 373, 206/541–550, 315.1, 315.11; 220/331, 334, 339; 312/272, 272.5, 274, 326, 327, DIG. 33; 43/54.1, 57.1, 57.2

[56] References Cited

U.S. PATENT DOCUMENTS

| | | | |
|---|---|---|---|
| 825,177 | 7/1906 | Bales | 206/541 |
| 1,577,566 | 3/1926 | Cryder | 43/57.2 |
| 2,049,080 | 7/1936 | Pickup | 220/331 |
| 2,125,856 | 8/1938 | De Witt | 43/57.1 |
| 2,539,302 | 1/1951 | Fye | 43/54.1 |
| 2,611,479 | 9/1952 | Oliver | 206/373 |
| 3,047,349 | 7/1962 | Powell | 43/54.1 |
| 3,185,338 | 5/1965 | Henning | 220/334 |
| 3,251,638 | 5/1966 | Schwartz | 43/57.1 |
| 3,437,389 | 4/1968 | Perkins et al. | 43/54.1 |
| 3,606,005 | 9/1971 | Meksula | 312/DIG. 33 |
| 3,995,764 | 12/1976 | Zagami | 220/331 |
| 4,006,821 | 2/1977 | Sautter | 312/DIG. 33 |
| 4,230,381 | 10/1980 | Rhoades | 220/331 |
| 4,266,835 | 5/1981 | Schmidt | 312/DIG. 33 |
| 4,285,556 | 8/1981 | Loeffel | 206/372 |

FOREIGN PATENT DOCUMENTS

| | | | |
|---|---|---|---|
| 0081471 | 12/1955 | Netherlands | 312/327 |
| 0083592 | 7/1956 | Netherlands | 220/331 |
| 1193854 | 6/1970 | United Kingdom | 220/331 |

Primary Examiner—George E. Lowrance
Assistant Examiner—Jimmy G. Foster
Attorney, Agent, or Firm—Harvey B. Jacobson

[57] ABSTRACT

A tackle box with a plurality of independently pivotal trays oriented in a tiered arrangement and provided with a side closure for each side of the box. In one embodiment, the tackle box housing includes a bottom member, a pair of end members upstanding from the bottom member connected by connecting walls to form a U-shaped structure, a generally U-shaped flanged end receiver coupling pairs of the end members, a top support channel bridging the tackle box housing and supported at its ends by a top support adapter connected to the U-shaped end receiver, a carrying handle on the top support channel, a central divider secured to the bottom member and fastened to the top support channel and handle, a series of bait trays having opposite ends pivoted to the end member and a side cover assembly including a guide bar and an interlocking lip disposed to be received within an adjacent space. When in its extended position, the side cover assembly extends as a cover peripherally of the tackle box housing and has a series of snap buttons at the lower edge thereof for engaging a snap button arrangement on a hingedly provided side door thereby completing respective closure coverings for the tackle box. In another embodiment, an articulated hinged side cover is provided to fold back and allow access to the trays in the tackle box, thereby greatly simplifying the structure.

6 Claims, 8 Drawing Figures

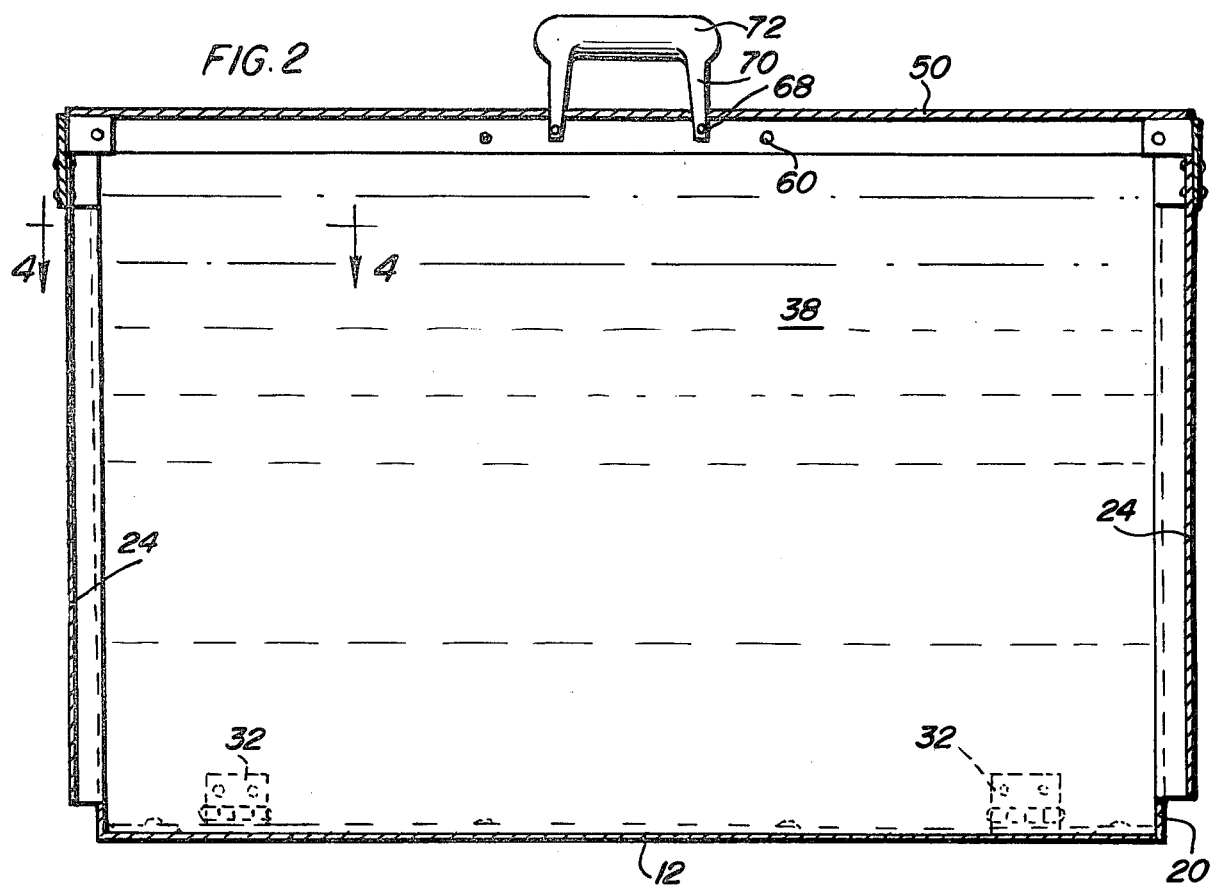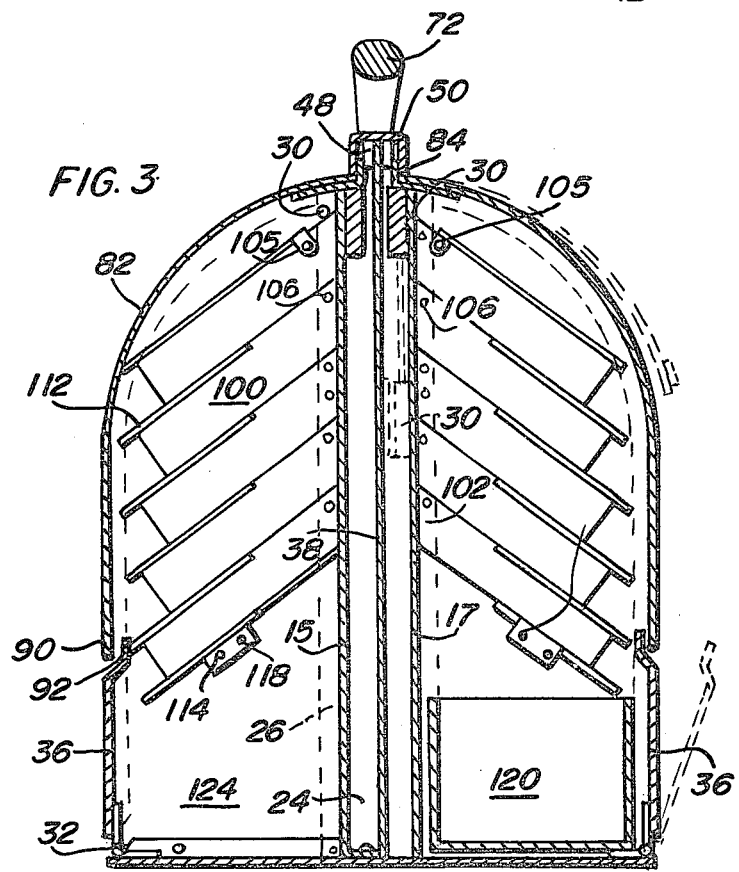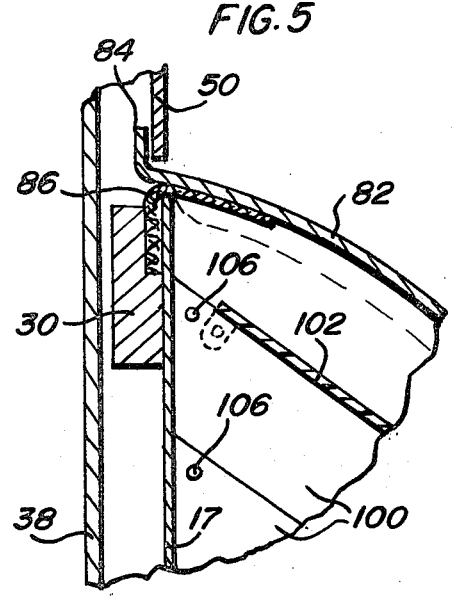

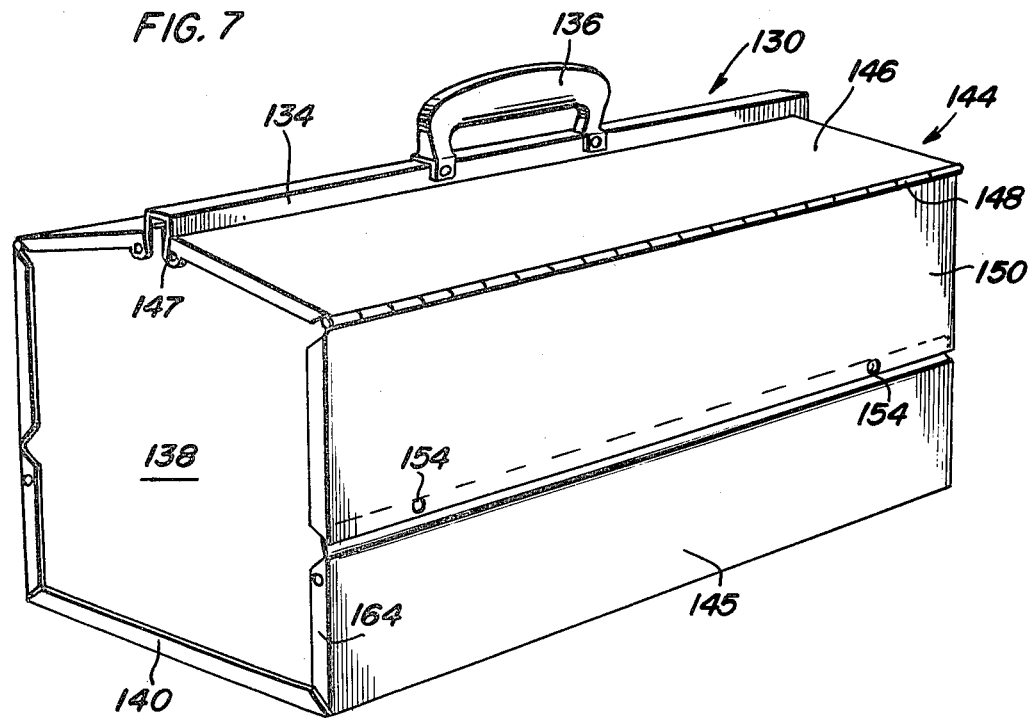
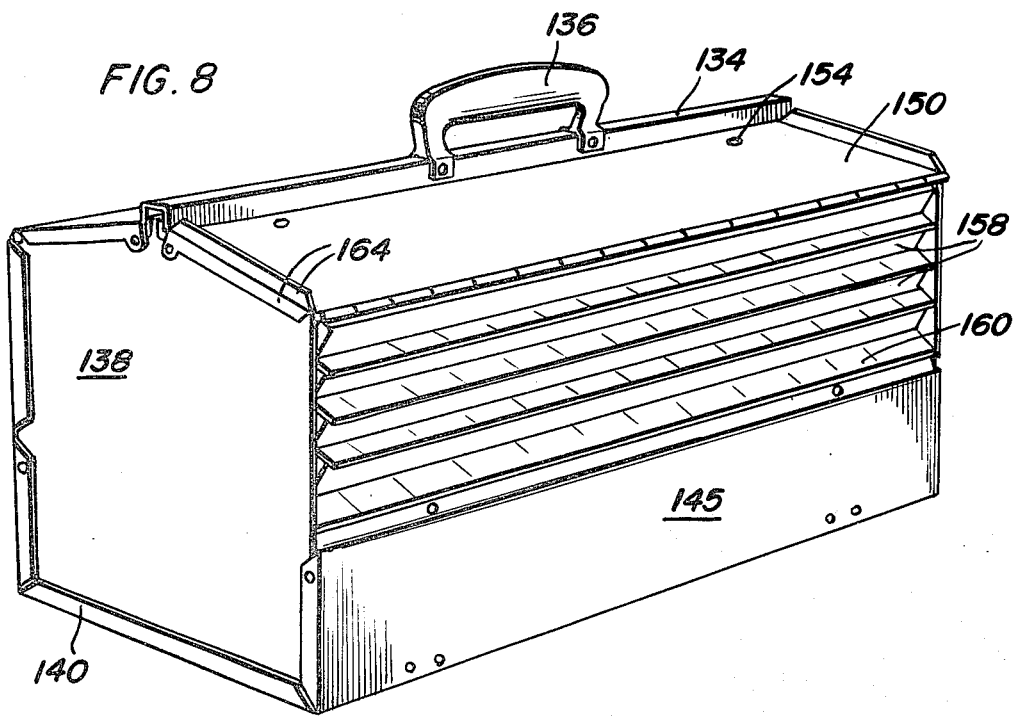

TACKLE BOX WITH PIVOTAL TRAYS

BACKGROUND OF THE INVENTION

1. Field of the Invention

The present invention relates to a tackle box with pivoted trays that can be independently pivoted in the tackle box and more particularly, the invention relates to a tackle box having trays providing for easy access to a selection of lures or baits stored in the trays and without cumbersome opening and unfolding of trays as is necessary with known prior art tackle boxes. Also within the purview of the invention is an alternate arrangement in which there are upwardly swinging or pivotal cover panels to allow access to the trays without using guide bars, center dividers or end receiver members. More particularly, it is a feature of the present invention to provide a pivoted transparent plastic panel for the top of the upper tray and similar panels cemented to bottoms of the trays to form extensions which form an inclined weather cover for the tray below, when the trays are in a normally tilted arrangement and thus prevent water accumulation in the trays. These panels also prevent bait from vibrating out of the trays when the boat is moving rapidly over rough water.

2. Description of the Prior Art

Various prior art devices and arrangements of conventional tackle box constructions are known in which there are trays for providing a selection of lures and these include U.S. patents as follows:

| U.S. Pat. No. 1,858,539 | C. L. Dewey |
| U.S. Pat. No. 2,474,752 | O. A. Montgomery |
| U.S. Pat. No. 2,889,658 | D. L Shanks |
| U.S. Pat. No. 2,936,066 | B. Meksula |
| U.S. Pat. No. 3,182,872 | V. N. Brosseau |
| U.S. Pat. No. 3,251,638 | R. M. Schwartz |
| U.S. Pat. No. 3,346,313 | E. W. Fee |
| U.S. Pat. No. 3,948,579 | R. E. Schirmer |

These constructions require a cumbersome opening and unfolding of trays for the selection of lures and none of these known prior art arrangements disclose all of the specific details of the present invention in such a way as to bear upon the patentability of any claims of the present invention.

SUMMARY OF THE INVENTION

An object of the present invention is to provide a tackle box housing and closure assembly that will appeal to fishermen in the manner in which selection of lures is made from any of a series of inclined trays containing lures, the trays having bottom extensions to cover the next lower tray.

Another object and advantage of the present invention is to provide a more practical arrangement of elements forming a tackle box and tray assembly making it easier for the selection of lures without a cumbersome opening and unfolding of trays as is found in the use of certain known prior art devices.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a longitudinal sectional view taken along line 2—2 of FIG. 1.

FIG. 3 is a transverse sectional view taken along line 3—3 of FIG. 1.

FIG. 5 is an enlarged sectional view of certain details generally illustrated in FIG. 3.

FIG. 7 is a perspective view of another embodiment of the tackle box in closed condition.

FIG. 8 is a perspective view of the tackle box of FIG. 7 with the upper side wall pivoted to a partially open position.

DESCRIPTION OF THE PREFERRED EMBODIMENTS

Figure 1:
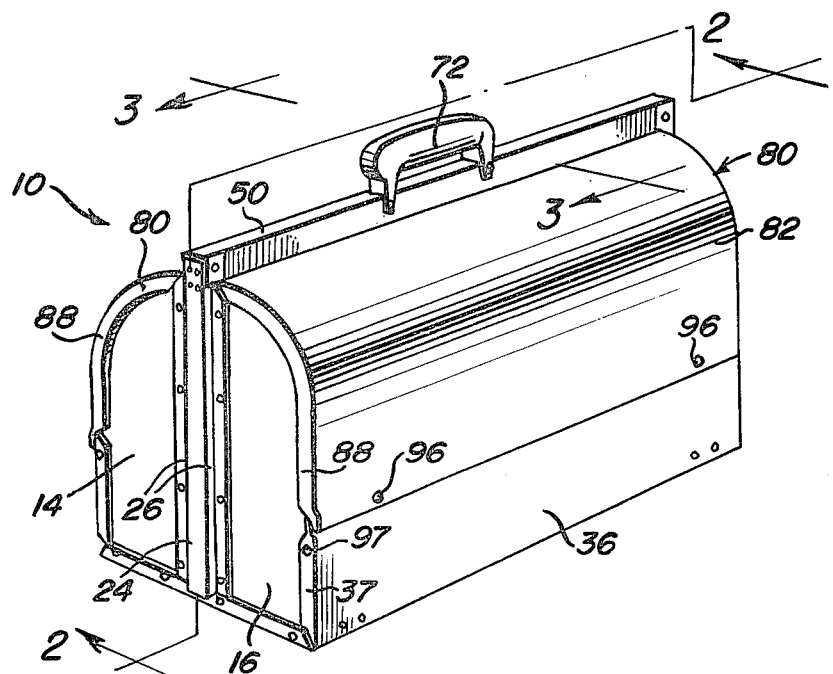
FIG. 1 is a front perspective view of a tackle box having a cover or closure assembly for the trays according to the present invention.
Figure 4:
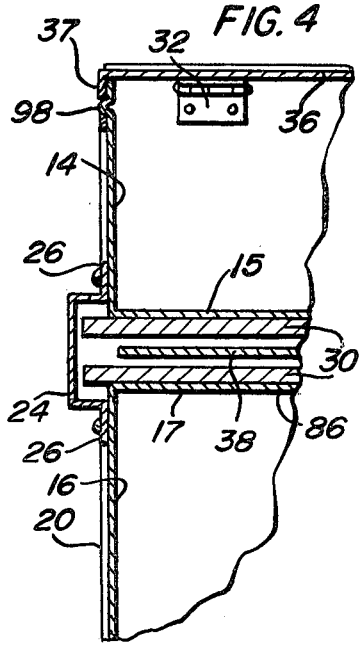
FIG. 4 is a fragmentary sectional view taken along line 4—4 of FIG. 2.

Referring now to the drawings, there is shown in FIGS. 1-6 a tackle box and tray assembly 10 having a bottom member 12 being substantially flat throughout to which laterally spaced end members 14, 16 are fastened, each including integrally constructed connecting walls 15, 17. The connecting walls, 15, 17 are central components of spaced end members 14, 16 to form a U-shaped member and include 90° bends at each of the lateral ends of the connecting walls 15, 17 formed with the spaced end members 14, 16. Each end of bottom member 12 has an upstanding flange 20 with each flange having a pair of end members 14, 16 secured thereto by rivets or screw fasteners passing through openings 22, 23. When end members 14, 16 are assembled onto the bottom member 12, the space between the end members 14, 16 is spanned by a U-shaped end channel or receiver 24 having along the opposite side edges thereof a flange 26 that is supported by and connected to vertical adjacent edges of the end members 14, 16 by fasteners passing through openings 28. The U-shaped end receiver 24 forms a slide way along its U-shaped portion for receiving adjacent distal ends of a pair of guide bars 30 to be described more particularly below.

Along each side edge of the bottom member 12, there is a set of hinges 32, 34 for connecting a lower side door 36 to the bottom member 12 by fasteners securing the hinges respectively to the bottom member and the side door. Also secured to the bottom member 12 along its center is a vertical divider 38 having a flange element 40 along its lower edge and having openings 42 in alignment with openings 44 in the bottom member 12 and receiving fasteners therein to secure the two members 12, 38 together. The central components on the connecting walls 15, 17 constitute a central panel parallel throughout with the vertical divider 38 and provide a space or recessed compartment therebetween for receiving respective side covers 82 to be described below when the assembly 10 is opened.

An inverted U-shaped top member 50 having a downwardly opening channel 48 extends across the top of the tackle box 10. Member 50 has end openings 52 for mating with openings 54 in a top support adapter 56 having a U-shaped member 57 and a plate 59 with openings 52 and 54 receiving fasteners passing therethrough. The top support adapter 56 also has openings 58 in the plate 59 aligned with openings 60 at the top end of the U-shaped end receiver 24. Fasteners secure these openings 58, 60 together.

It is noted that end edges 62 of divider 38 do not extend within the U-shaped portion or recess of the end receivers 24 but the top edge 64 has openings 66 that are aligned with openings 68 in handle extensions 70 of a carrying handle 72, the extensions 70 passing through opening 74 in the top member 50 and fasteners passing through openings 66, 68 securing the carrying handle 72 into fixed relation with the divider 38 for carrying the tackle box 10.

The top support adapter 56 is a plastic or metal formed element having a generally U-shaped structure at one end containing the openings 54 and having the plate 59 extending generally from the central segment of the U-shaped structure of member 57.

Figure 6:
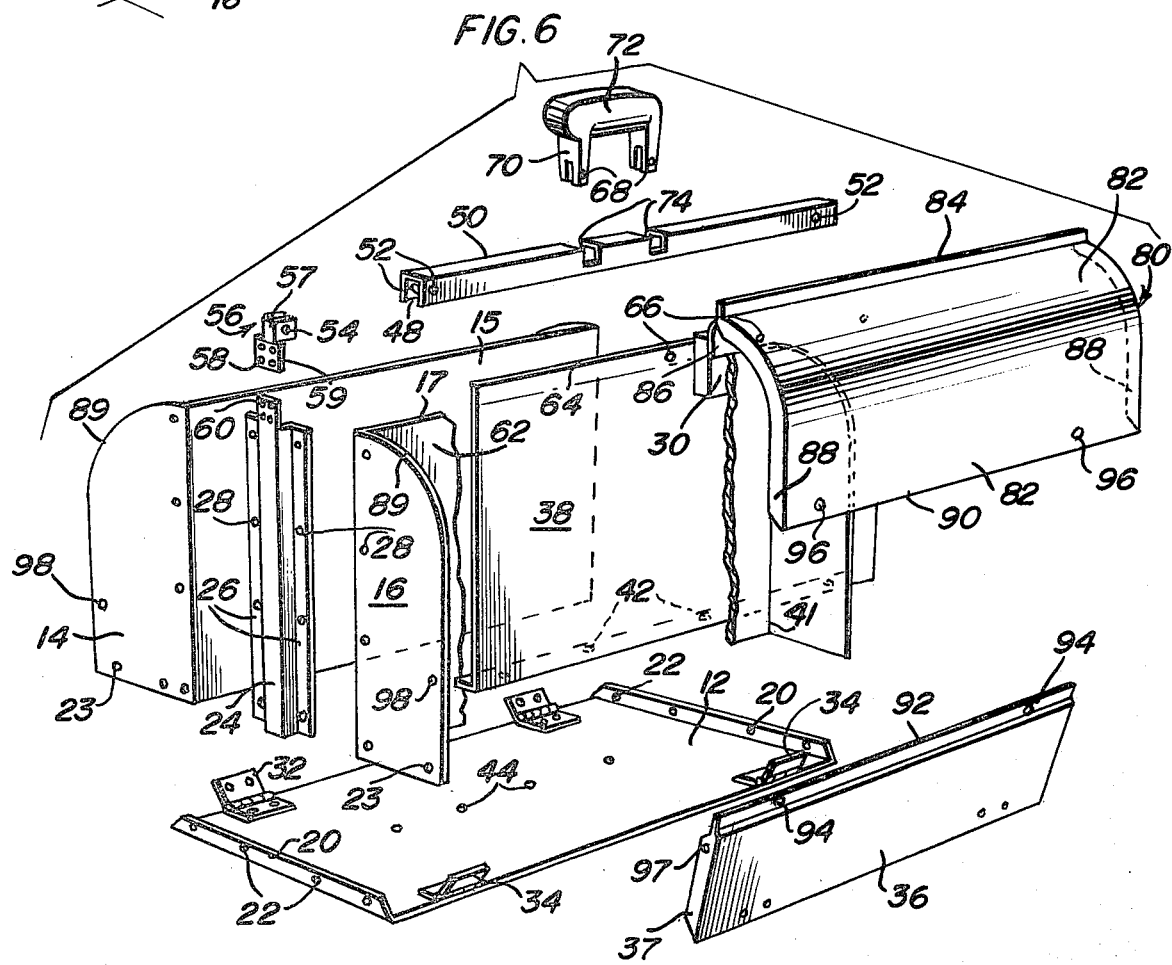
FIG. 6 is an exploded group perspective view of some of the component parts of the tackle box without the trays.

The tackle box 10 has on opposite sides thereof an upper side cover assembly 80 consisting of an arcuate side cover 82 constructed of a flexible metal or preferably thin sheet plastic material such as aluminum or conventional plastic, and the like, and having a weather joint performing also as interlocking lip 84 generally angularly oriented in an approximate angle of 90° and thus forming a bend with the adjacent portion of the side cover 82. The interlocking lip 84 is not seen in FIG. 1 since it is retained by the nature of its angular construction within the recess 48 formed in the top member 50. Also integrally formed and adjacent the interlocking lip 84 is a strap hinge 86 shown in FIGS. 5 and 6 interconnecting side cover 82 with an upper portion of the guide bar 30 described above, each of the opposite ends of guide bar 30 accordingly extending and being received within the channel portion formed by the U-shaped end receiver 24. Thus, the guide bar 30 extends from within one recess in the U-shaped end receiver 24 at one end to the other end receiver 24. A curved edge lip 88 extending along each lateral side of the side cover 82 provides a weather joint protection as the curved edge lip 88 extends over and encompasses a mating curved edge 89 on end members 14, 16 as shown in FIG. 1. Along the bottom edge of the side cover 82, there is constructed an overhang portion 90 that extends over a recessed portion 92 of the lower side door 36 and by the arrangement of these portions 90, 92 there is provided weather protection from, for example, inclement rain and water splashing over the side of the boat onto the tackle box, such that the droplets received on the surface of the cover 82 will roll until they reach a ground, floor or deck surface. Similarly, although not shown, the flange 20 may be disposed within the space comprising the tackle box while the adjacent edges of end members 14, 16 may extend in overlying relation of the flange 20 and provide a like weather connection. Provided on the side door 36 is a spaced pair of male snap buttons 94 for engaging female snap buttons 96 along a matingly engaging undersurface of overhang portion 90 of the side cover 82 as shown in FIG. 6 and in closed relation in FIG. 1. The end edges of side door 36 includes a flange 37 with a hole 97 therein to frictionally engage a protuberance 98 formed in the end walls 14 and 16 thus releasably retaining the door 36 closed.

The tackle box 10 is opened from the closed condition of FIG. 1 by unsnapping the buttons 96 on the side cover from the buttons 94 on the side door and by raising the side cover 82, the sheet portion of the side cover adjacent the top member 50 is fed into the space within the tackle box 10 by means of the resiliency of the side cover 82 providing a force or impact upon the guide bar 30 to push or slide its ends downwardly along the interior portion of the U-shaped end receiver 24, the sides of the guide bar 30 has one surface sliding along the surface of the divider on one side while another surface of the guide bar engages the interior side surface of the adjacent U-shaped end receiver 24 so the guide bar is capable of moving along the entire length in the recess of the U-shaped end receivers 24 until the entire interior space on that side of the tackle box 10 is open when the side cover 82 is received within the tackle box 10 in the space or recess compartment formed by respective ones of the connecting walls 15, 17 and the vertical divider 38. Within one purview of the invention is to provide joinder of the end members 14, 16 to the U-shaped end receiver 24, also having 90° flanges, such that the connecting walls 15, 17 are coplanar with respective adjacent portions of the U-shaped end receiver 24, and a corresponding purpose and function achieved by these coplanar portions of and receiver 24 may allow elimination of the respective connecting walls 15, 17. This can be seen illustrated in FIG. 5. FIG. 3 illustrates the guide bar 30 lowered about one-half the distance within the space adjacent the divider 38 on the right side thereof while on the left side of the divider 38, the guide bar 30 is in its fully raised position while the side cover 82 on the left side is in a lowered or closed position.

The guide bar 30 is connected to the side cover 82 by the strap hinge 86 or fastener member such as any conventional hinge structure, or the strap hinge 86 may be received within an interior portion of the guide bar 30 along a medial recess within the guide bar (not shown) or, as is shown in FIG. 6, the strap hinge 86 is secured to the guide bar 30 by fasteners, rivets, or the like.

The construction of the interlocking lip 84 is such that it extends generally 90° upwardly from the side cover 82 to form its weather joint lip construction and serving to retain coupling of the side cover onto the tackle box 10, the lip 84 being sufficiently flexible to assume the position shown in FIG. 3, while the strap hinge 86 fastens to the guide bar in a generally opposite 90° bend with respect to the adjacent surface of the side cover 82.

A plurality of tiered trays 100 are pivotally supported by pivot elements 106 at the upper inner corner of each tray to pivotally connect the trays 100 to the flange 26 in a generally inclined orientation of about 45° is shown. In this way, unwanted water within the tray will collect at the bottom from where it will drain through small apertures (not shown). The trays 100 are stably secured in the angular and rest position shown due to the trays interacting with each other and, where the respective connecting walls 15, 17 are installed, the walls 15, 17 provide abutment surfaces contacting a rear wall of the trays 100 for securement of trays in the angular and rest position, cooperating, of course, with tray stops 114. The bottommost trays have transparent extensions 112 and the entire tray bottom may be transparent for allowing and facilitating full optical or visual access to the two lower compartments, such as a rack 120 and space 124, described below. Each of the trays 100 has a transparent extension 112 on the bottom to overlie and close the forward portion of an underlying tray so that the lures in the next lower tray can be observed to facilitate selection of baits and removal from the bait trays 100 and the extension 112 provided downwardly extending tabs by which the trays can be lifted upwardly. The extensions may extend along the entire length and be integral with the bottom of the trays 100.

The bottom tray 100 is provided with tray stops 114 secured by fasteners 118 to end members 14, 16 so that the several trays 100 are maintained in their desired inclined orientation by the tray stops 114. The stops 114 provide a limit to the downward arcuate movement of the several trays 100 so that they are capable of moving only in an upward direction from the bait tray stop 114. The trays 100 may be compartmented to facilitate selection of bait or lures and prevent entanglement of the bait or lures. Also, the top tray is provided with an entire transparent cover 102 to retain bait therein and to prevent entry of water. The transparent cover 102 has a set of two downwardly extending tabs 105 pivotally engaging with an upper adjacent surface of the top tray 100. The tabs 105 and the pivots positioned inside the trays allow the trays to operate without interference from other components when being pivoted. A removable spinner bait container or rack 120, trays 100 so that they are capable of moving only in an upward direction from the bait tray stop 114. The trays 100 may be compartmented to facilitate selection of bait or lures and prevent entanglement of the bait or lures Also, the top tray is provided with an entire transparent cover 102 to retain bait therein and to prevent entry of water. A removable spinner bait container or rack 120, shown in FIG. 3, provides storage for spinners and like elements. Also provided within the tackle box 10 is an open storage area 124, shown in FIG. 3, for receiving and storing articles.

Another embodiment of the invention is shown in FIGS. 7 and 8 in which a tackle box 130 is provided with similar elements such as a top support channel 134, a handle 136, one piece end members 138 secured to the top support channel 134 and upwardly extending flanges 140 for engaging with the end members 138, the flanges 140 being part of a bottom member (not shown). Side doors 145 are hinged to the bottom member and engage with an articulated side cover 144 having an upper cover 146 coupled by a hinge 147 to top member 134 and hinge 148 to a lower side cover 150 which fastens similarly by male and female snap button fasteners 154 to the side door 145. The lower side cover 150 may be pivoted along the hinge 148 upwardly so that it rests on the upper cover 146 and both covers 146 and 150 pivoted upwardly about hinge 147 to provide access to the tiered, pivotal, compartmented trays 158, each being provided with a transparent bottom extension 160 similar to the extension 112 on the trays 100. The upper and lower side covers 146, 150 are each provided with an edge or flange 164 that provides and functions as a weather joint.

The assembly and boxes 10, 130 may be constructed in part or entirely by processes of injection molding of plastics and similar type materials used generally in the construction and assembly of the box components.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tackle box assembly comprising a bottom member of generally rigid construction throughout, a pair of spaced end wall members at each end of the assembly, the end wall members having their lower edges secured to the bottom member, a recessed end member at each end of the assembly, each recessed end member being secured to the proximate adjacent edges of the end wall members bridging the space defined between said end wall members, a top support channel having a recess along a bottom portion thereof and having ends thereof fastened to upper portions of the recessed end members, a divider means having its lower end affixed to the bottom member along a central portion thereof and having its upper edge received within the recess of the top support channel, separate side cover assemblies for opposite sides of the tackle box, each side cover assembly being supported from its upper edge portion by a guide bar having its ends received within the recessed end members and slidingly engaging along the recessed end members for guiding said side cover assembly when moving between open and closed positions.

2. The invention according to claim 1 wherein said bottom member has hingedly attached thereto a side door on each side of the bottom member, and fastener means between the free edge of the side door and the free edge of the respective side cover assembly for interengaging and securing the tackle box into a closed relation.

3. The invention according to claim 1 wherein each side cover assembly is provided with an upper edge lip for weather protection of the tackle box along lateral edges of the side cover assembly and the side cover assembly being provided with an interlocking lip along the upper edge thereof extending in an opposite relation to the guide bar, the interlocking lip being received in the recess in the top support channel thereby providing weather protection to the tackle box.

4. The invention according to claim 1 wherein a top support adapter means intercouples the top support channel to the recessed end members, and handle means including an extension means from the handle to engage with said divider means, the extension means passing through apertures in the top support channel.

5. The invention according to claim 1 wherein an array of superposed tiered trays are individually pivotally mounted from interior surfaces of the end wall members on one side of the assembly, a stop being provided on one of said end wall members for holding the trays in downwardly inclined disposition, the trays being raisable individually to obtain access to a tray therebelow.

6. The invention according to claim 2 wherein the side door has along lateral edges thereof a recess for receiving a protuberance in mating engaging relation that extends from an adjacent end member for retaining the side door in upright position.

* * * * *